(12) United States Patent
Norgren et al.

(10) Patent No.: US 11,213,892 B2
(45) Date of Patent: Jan. 4, 2022

(54) CEMENTED CARBIDE WITH ALTERNATIVE BINDER

(71) Applicant: SANDVIK INTELLECTUAL PROPERTY AB, Sandviken (SE)

(72) Inventors: Susanne Norgren, Huddinge (SE); Erik Holmstrom, Huddinge (SE); David Linder, Sollentuna (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 689 days.

(21) Appl. No.: 16/080,327

(22) PCT Filed: Feb. 28, 2017

(86) PCT No.: PCT/EP2017/054552
§ 371 (c)(1),
(2) Date: Aug. 28, 2018

(87) PCT Pub. No.: WO2017/148885
PCT Pub. Date: Sep. 8, 2017

(65) Prior Publication Data
US 2021/0197288 A1    Jul. 1, 2021

(30) Foreign Application Priority Data
Feb. 29, 2016    (EP) .................................... 16157830

(51) Int. Cl.
*B23B 27/14* (2006.01)
*B22F 3/16* (2006.01)
*B22F 5/00* (2006.01)

(52) U.S. Cl.
CPC .............. *B23B 27/148* (2013.01); *B22F 3/16* (2013.01); *B22F 2005/001* (2013.01);
(Continued)

(58) Field of Classification Search
CPC .................. B23B 27/14; B23B 27/148; B23B 2224/12; B23B 2224/32; B23B 2224/36; C22C 29/005; C22C 29/02; C22C 29/08
(Continued)

(56) References Cited

U.S. PATENT DOCUMENTS 4,277,283 A * 7/1981 Tobioka ................ C23C 30/005
419/18
5,266,388 A * 11/1993 Santhanam ........... B23B 27/148
51/307
(Continued)

FOREIGN PATENT DOCUMENTS

CN         1827817 A        9/2006
CN       102796933 A       11/2012
(Continued)

OTHER PUBLICATIONS

Toller et al. "Hard Materials—Alternative Binders:Investingation of Cemented Carbides with Alternative Binders after CVD coating" the European Power Metallurgy Association conference paper& proceedings p. 1-6. (Year: 2015).*
(Continued)

*Primary Examiner* — Archene A Turner
(74) *Attorney, Agent, or Firm* — Corinne R. Gorski

(57) ABSTRACT

The present disclosure relates to a cutting tool including a cemented carbide substrate having WC, gamma phase and a binder phase. The substrate is provided with a binder phase enriched surface zone, which is depleted of gamma phase, wherein no graphite and no ETA phase is present in the microstructure and wherein the binder phase is a high entropy alloy.

8 Claims, 1 Drawing Sheet

(52) U.S. Cl.
 CPC ....... *B22F 2207/03* (2013.01); *B22F 2302/10* (2013.01); *B22F 2302/15* (2013.01); *B22F 2302/20* (2013.01); *B23B 2224/12* (2013.01); *B23B 2224/20* (2013.01); *B23B 2224/32* (2013.01); *B23B 2224/36* (2013.01)

(58) Field of Classification Search
 USPC ........................ 75/236, 242; 419/18; 428/698
 See application file for complete search history.

(56) References Cited

U.S. PATENT DOCUMENTS

| | | | | |
|---|---|---|---|---|
| 5,310,605 | A | * | 5/1994 | Baldoni, II ............. C22C 1/051 428/569 |
| 5,729,823 | A | * | 3/1998 | Gustafson ............... C22C 29/02 428/698 |
| 6,344,264 | B1 | * | 2/2002 | Lenander ................. C22C 29/08 428/216 |
| 2006/0257692 | A1 | * | 11/2006 | Norgren ................... C22C 29/08 428/698 |
| 2015/0063930 | A1 | * | 3/2015 | Hedin ....................... B23C 5/10 407/119 |
| 2016/0115085 | A1 | * | 4/2016 | Norgren ................... C22C 29/02 501/87 |
| 2016/0122250 | A1 | * | 5/2016 | Garcia ..................... C22C 29/02 428/457 |

FOREIGN PATENT DOCUMENTS

| | | |
|---|---|---|
| CN | 104024447 A | 9/2014 |
| WO | 2014191505 A1 | 12/2014 |

OTHER PUBLICATIONS

Josa Garcia. "Invenstigations on kinetics of formation of fcc-free surface layers on cemented carbides with Fe Ni Co binders", International Journal of Refractory Metals and Hard Materials. Elsevier, vol. 29, No. 2, pp. 306-311. Dec. 3, 2010, Amersterdam, NL.

Chi-San et al. "Novel cermet material of WC/multi-element alloy", Inetrnational Journal of Refractory Metals and Hard Materials. vol. 43, pp. 200-204. Mar. 1, 2014, Amersterdam, NL.

A.G. De La Obra et al. "A new family of cermets: Chemically complex but microstructurally simple", International Journal of Refractory Metals and Hard Materials, Apr. 1, 2016, whole document, Amsterdam, NL.

\* cited by examiner

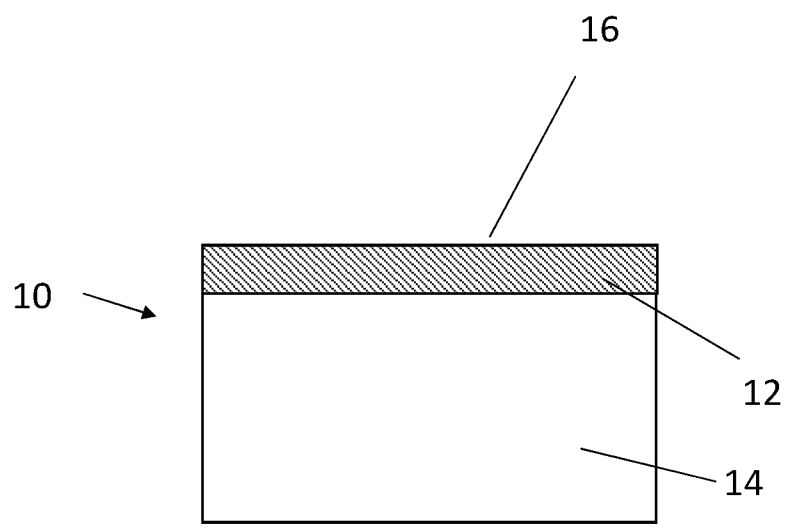

CEMENTED CARBIDE WITH ALTERNATIVE BINDER

RELATED APPLICATION DATA

This application is a § 371 National Stage Application of PCT International Application No. PCT/EP2017/054552 filed Feb. 28, 2017 claiming priority to EP 16157830.7 filed Feb. 29, 2016.

TECHNICAL FIELD

The present invention relates to a cutting tool and a method of making a cutting tool comprising a cemented carbide substrate wherein the binder phase is a high entropy alloy.

BACKGROUND

Cemented carbides based on WC with a cobalt binder have been known in the art since the forties. Other metals that are known as binder metals in cemented carbides are iron and nickel, however cobalt is the far most used.

It is an ongoing strive to find alternatives to cobalt due to its environmental and health impact. However, it is not easy to replace or limit the amount of cobalt without impacting material properties in a negative way. For cutting tools the substrate properties are important for the overall performance of the tool and even small changes in composition can have a detrimental impact on the performance.

One type of substrates that are used in cutting tools are gradient sintered substrates. By that is meant that they comprise a binder enriched surface zone depleted of gamma phase, whereas the bulk contains gamma phase. When replacing the binder phase for such substrates, the gradient zone is not formed in the same predicable way as in the case when Co is binder phase. In some cases no surface zone is formed and in other cases the surface zone becomes too large.

It is therefore an object of the invention to achieve a cemented carbide with a binder enriched surface zone depleted of gamma phase with an alternative binder phase.

It is also an object of the invention to be able to manufacture a cemented carbide with an alternative binder phase using conventional raw materials, i.e. not be forced to use ultra pure raw materials, i.e. to use carbides or metallic powders of the elements that are to form the high entropy alloy.

SUMMARY

The present invention relates to a cutting tool comprising a cemented carbide substrate, wherein said substrate comprises WC, gamma phase and a binder phase. The substrate is provided with a binder phase enriched surface zone which is depleted of gamma phase, wherein no graphite and no eta phase is present in the microstructure of said substrate. Further, the binder phase is a high entropy alloy.

A high entropy alloy (HEA) is an alloy comprising of at least 4 metallic elements where the amount of each element is between 5 to 35 at %, i.e. no element is dominating.

In one embodiment of the present invention, at least one of the elements in the high entropy alloy is selected from Cr, Fe, Ni and Co.

In another embodiment of the present invention, at least two of the elements in the high entropy alloy are selected from Cr, Fe, Ni and Co.

In one embodiment of the present invention, the elements in the high entropy alloy are selected from W, Co, Cr, Cu, Fe, Ni, Ti, Al, V, Zr, Mo and Mn, preferably from Co, Cr, Cu, W, Fe, Ni, Mo and Mn.

In one embodiment of the present invention, the high entropy alloy comprises Co, Cr, Fe and Ni.

In one embodiment of the present invention, the high entropy alloy comprises Co, Cr, Cu, Fe and Ni.

In one embodiment of the present invention, the average amount of binder phase is suitably from 3 to 30 at %, preferably between 4 to 25 at % of the total sintered insert.

For prior art materials, the most common way to describe the amount of binder phase, i.e. usually cobalt, is by weight. However, since the elements in the high entropy alloy as described above have a large variation of molar weight, a weight fraction is difficult to give. Therefore, the suitable amount of high entropy alloy binder phase when replacing Co can be determined by aiming for the corresponding amount of atom fraction of the binder phase instead of weight fraction.

In some cases, the high entropy alloy binder phase can contain smaller or larger amounts of other elements which will dissolve into the binder phase during sintering. The exact amounts of such elements are determined by the specific elements solubility into the specific high entropy alloy. Examples of such elements are oxygen, carbon and nitrogen, which originate from the other raw materials.

Cemented carbide comprises large amounts of WC and tungsten will also dissolve into the binder phase. The exact amount tungsten dissolved into the binder phase is dependent on the solubility of tungsten into the specific high entropy alloy. In some cases, the amount of tungsten on the binder will exceed 5 at % of the binder, i.e. tungsten will be one of the at least 4 elements constituting the high entropy alloy, and in some cases the amount of tungsten in the binder phase will be considerably smaller.

The gamma phase, which is a solid solution of cubic carbides and carbonitrides, is formed during sintering from cubic carbides or carbonitrides and WC and can be described as (W,M)C or (W,M)(C,N) wherein M is one or more of Ti, Ta, Nb, Hf, Zr and V.

Depending on the specific elements selected for the high entropy alloy, the gamma phase may also contain one or more of the high entropy alloy elements depending on its solubility in the gamma phase.

The surface zone is depleted from gamma phase and by that is meant that no, or only trace amounts of gamma phase are present.

In the bulk, i.e. the area outside the surface zone, the amount of gamma phase is suitably between 3 to 25 vol %, preferably between 5 to 15 vol %. This can be measured in different ways but one way is to make an image analysis of either a Light Optical Microscope image or a Scanning Electron Microscope (SEM) micrograph of a cross section of the substrate to calculate the average fraction of gamma phase.

The thickness of the binder phase enriched surface zone depleted from gamma phase is suitably between 2 to 100 µm, preferably between 3 to 70 µm and more preferably 8 to 35 µm. The thickness is determined by measuring on a SEM or LOM image of a cross section of the substrate. Those measurements should be performed in areas where the substrate surface is reasonably flat, i.e. not close to the edge or nose etc. in order to get a true value. The boundary between the surface zone and the bulk is determined by the absence/presence of gamma phase which is usually quite distinct when looking at a cross-section of the substrate in a SEM or LOM image.

The binder phase enrichment is a result of the sintering process and means that the binder phase content in the surface zone is higher than in the bulk. Preferably, the binder phase content in the surface zone is 1.2-2.0 times the binder phase content in the bulk. The measurements of the binder phase content in the surface zone are preferably done in the center of the surface zone, which is herein meant at a depth from the surface of approximately 50% of the total thickness of the surface zone.

In order to achieve the surface zone depleted of cubic phase it is necessary to have a carbon content such that no graphite and no eta phase is present in the microstructure. By eta phase is herein meant $M_6C$ and $M_{12}C$ where M is selected from W and one or more of the binder phase metals.

It is well known in the art that an excess of carbon would lead to graphite precipitates in the microstructure whereas a shortage of carbon would form eta phase. The range where both graphite and eta phase could be avoided is usually determined from a phase diagram. In the case where cobalt is the binder metal, these phase diagrams are well known.

For alternative binder phases such as a high entropy alloy, the phase diagram for each specific binder phase composition is not easy to predict, i.e. the range in carbon content where no graphite and no eta phase is present, will vary depending on amount and composition of the binder phase. Therefore, it is up to the person skilled in the art to find the optimal carbon content for each specific binder phase composition.

Methods of changing the carbon content in a cemented carbide is known in the art. For example, it can be done by either adding carbon black, if an increase in carbon is desired. Or, by adding W, or $W_2C$, if a decrease in carbon is desired.

In one embodiment of the present invention, carbides such as $M_7C_3$ and/or $M_3C_2$, can be present where M is one or more of W, Co, Cr, Cu, Fe, Ni, Ti, Al, V, Zr, Mo and Mn.

In one embodiment of the present invention, the cemented carbide substrate is provided with a coating.

In one embodiment of the present invention, the cemented carbide substrate is provided with a wear resistant CVD (Chemical vapor deposition) or PVD (Physical vapor deposition) coating.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In yet another embodiment of the present invention, the cemented carbide substrate is provided with a wear resistant CVD coating.

In yet another embodiment of the present invention, the cemented carbide substrate is provided with a wear resistant CVD coating comprising several layers, suitably at least a carbonitride layer and a $Al_2O_3$ layer, preferably at least one Ti(C,N) layer, a α-$Al_2O_3$ and an outer TiN layer.

By cutting tool is herein meant an insert, end mill or drill. In one embodiment of the present invention, the cutting tool is an insert, preferably a turning insert.

The present invention also relates to a method of making a cutting tool comprising a cemented carbide substrate as described above. The method comprising the following steps:
providing powders forming hard constituents comprises WC, at least one cubic carbide and at least one nitride or carbonitride of Ta, Ti, Nb, Cr, Hf, V and Zr.
providing powders forming the high entropy alloy binder phase
providing a milling liquid,
milling, drying, pressing and sintering the powders into a cemented carbide.

The raw materials forming the high entropy alloy binder phase can be added as pure metals, alloys of two or more metals or as carbides, nitrides or carbonitrides thereof. The raw materials should be added in such amounts so that the binder phase, after sintering will comprise of at least 4 metallic elements where the amount of each element is at between 5 to 35 at %.

The powders forming hard constituents comprises WC, at least one cubic carbide and at least one nitride or carbonitride of Ta, Ti, Nb, Cr, Hf, V and Zr. Also mixed carbides like e.g. (M,W)C where M is one or more of Ta, Ti, Nb, Cr, Hf, V and Zr, can be added. The nitride and carbonitride components are added in order to obtain the binder phase enriched surface zone depleted from gamma phase.

In one embodiment of the present invention, at least one part of the powders forming hard constituents are added as a powder fraction made from recycled cemented carbide scrap, comprising the elements W, C and Co and at least one or more of Ta, Ti, Nb, Cr, Zr, Hf and Mo.

Changing the carbon content in a cemented carbide can be done by either adding carbon black, if an increase in carbon is desired. Or, by adding W, or $W_2C$, if a decrease in carbon is desired.

Any liquid commonly used as a milling liquid in conventional cemented carbide manufacturing can be used. The milling liquid is preferably water, alcohol or an organic solvent, more preferably water or a water and alcohol mixture and most preferably a water and ethanol mixture. The properties of the slurry are dependent on the amount of milling liquid added. Since the drying of the slurry requires energy, the amount of liquid should be minimized in order to keep costs down. However, enough liquid need to be added in order to achieve a pumpable slurry and avoid clogging of the system. Also, other compounds commonly known in the art can be added to the slurry e.g. dispersion agents, pH-adjusters etc.

An organic binder is also optionally added to the slurry in order to facilitate the granulation during the following spray drying operation but also to function as a pressing agent for any following pressing and sintering operations. The organic binder can be any binder commonly used in the art. The organic binder can e.g. be paraffin, polyethylene glycol (PEG), long chain fatty acids etc. The amount of organic binder is suitably between 15 and 25 vol % based on the total dry powder volume, the amount of organic binder is not included in the total dry powder volume.

The slurry comprising powders forming hard constituents and powders forming the binder phase comprising high entropy alloy, and possibly an organic binder are suitably mixed by a milling operation, either in a ball mill or attritor mill. The milling is suitably made by first forming a slurry comprising metal binder powder, the first and second powder fraction, and possibly an organic binder. Then the slurry is suitably milled in a ball mill or attritor mill to obtain a homogenous slurry blend.

The slurry containing the powdered materials mixed with the organic liquid and possibly the organic binder is atomized through an appropriate nozzle in the drying tower where the small drops are instantaneously dried by a stream of hot gas, for instance in a stream of nitrogen, to form agglomerated granules. For small scale experiments, also other drying methods can be used, e.g. pan drying.

Green bodies are subsequently formed from the dried powders/granules by a pressing operation such as uniaxial pressing, multiaxial pressing etc.

The green bodies formed from the powders/granules made according to the present invention, is subsequently sintered according to any conventional sintering methods e.g. vacuum sintering, Sinter HIP, spark plasma sintering, gas pressure sintering (GPS) etc.

The sintering temperature should be above the melting point for the specific high entropy alloy, preferably 40 to 100° C. above the melting point for the specific high entropy alloy.

In one embodiment of the present invention, the sintering temperature is between 1350 and 1550° C.

In one embodiment of the present invention, the sintering step comprises a gas pressure sintering step, either as a separate step or incorporated with first sintering step. The gas pressure step is performed under pressure, preferably between 2 and 200 Bar.

In one embodiment of the present invention the cemented carbide substrates are provided with a coating.

In one embodiment of the present invention the cemented carbide substrates made according to the above, is provided with a wear resistant coating using CVD or PVD-technique.

In one embodiment of the present invention a CVD coating is deposited comprising a first TiCN layer deposited by MTCVD and a second $\alpha$-$Al_2O_3$ layer deposited by CVD. Possibly an outermost color layer for wear detection, e.g. a TiN layer, can also be deposited.

The coating can also be subjected to additional treatments, such as brushing, blasting etc.

The present invention also discloses a cemented carbide cutting tool made according to the method described above.

BRIEF DESCRIPTION OF THE DRAWING

FIG. 1 is a cross-section of a cutting tool according to the present disclosure.

DETAILED DESCRIPTION

As shown in FIG. 1, cutting tool 10 includes a cemented carbide substrate 12, wherein the substrate comprises WC, gamma phase and a binder phase. The substrate 12 is provided with a binder phase enriched surface zone 14, which is depleted of gamma phase, wherein no graphite and no eta phase is present in the microstructure of the substrate and wherein the binder phase is a high entropy alloy. Substrate 12 is provided with a coating 16.

Example 1

Cemented carbides were prepared from the raw material powders constituting raw materials forming the high entropy alloy, 0.76 wt % TiC, 0.50 wt % NbC, 2.9 wt % TaC, 1.52 wt % Ti(C,N), 0.02 wt % carbon black and balance WC with an average grain size (FSSS) of 4 μm. The elements forming the High entropy alloy i.e. Co, Cr, Fe and Ni, are added as 0.99 wt % Co, 2.02 wt % $Cr_3C_2$, 4.85 wt % $Fe_{0.4}Ni_{0.4}Co_{0.2}$. The amount of each raw material is based in the total dry powder weight. The amount of each element to be part of the high entropy alloy is calculated to aim for a CoCrFeNi binder phase where the atomic ratio between the different elements is 1:1:1:1.

The powders were milled together with a milling liquid (water/ethanol) and an organic binder (PEG) 2 wt % calculated from the total dry powder weight. The formed slurry was then pan dried and the dried powder was then subjected to a pressing operation to form a green body.

The green body was then sintered at a temperature of 1470° C. for 1 h in vacuum. The sintered pieces were then subjected to a second sintering step gas pressure sintering at a temperature of 1520° C. and a pressure of 80 Bar for 1 h.

In Table 1 it is shown different cemented carbides with the same composition as described above but with a variation in carbon content. All cemented carbides have been made according to the above, except for the carbon content which was adjusted with either carbon or metallic W to obtain the desired carbon content.

The sintered body was studied in a light optical microscope (LOM) and the gradient zone (if present) was measured. The carbon content in Table 1 is the calculated value from the raw materials. The results are shown in Table 1.

TABLE 1

| | Gradient zone (μm) | Carbon content (wt %) | Eta phase/ graphite | Porosity | Hardness (HV3) |
|---|---|---|---|---|---|
| Sample 1 | 0 | 5.86 | Eta phase | A00B00C00E16 | 1954 |
| Sample 2 | 0 | 5.94 | Eta phase | A02B00C00E16 | 1705 |
| Sample 3 | 18 | 6.21 | No | A04B00C00 | 1798 |
| Sample 5* | 0 | 6.35 | Graphite | A08B06C06 | n.a. |

*Only sintered in 1470° C., i.e. no GPS step

Example 2

Cemented carbides were prepared in the same manner as described in Example 1 form raw materials forming the high entropy ally binder phase, 0.77 wt % TiC, 0.51 wt % NbC, 2.95 wt % TaC, 1.55 wt % Ti(C,N) and 0.08 wt % carbon black and the balance WC with an average grain size of 4 μm. The elements forming the High entropy alloy i.e. Co, Cr, Cu, Fe and Ni, are added as 0.77 wt % Co, 1.6 wt % $Cr_3C_2$, 3.85 wt % $Fe_{0.4}Ni_{0.4}Co_{0.2}$, 1.68 wt % Cu. The amount of each element to be part of the high entropy alloy is calculated to aim for a CoCrCuFeNi binder phase where the atomic ratio between the different elements is 1:1:1:1:1.

The samples were made in the same manner as in Example 1. In table 2, it is shown the results after the first sintering step, and in table 2, it is shown the results after the second sintering step, i.e. the gas pressure step.

TABLE 2

| | Gradient zone (μm) | Carbon content (wt % in powder) | Eta phase/ graphite | Porosity | Hardness (HV3) |
|---|---|---|---|---|---|
| Sample 1 | 0 | 5.95 | Eta phase | A08B00c00E16 | 1816 |
| Sample 2 | 6 | 6.15 | No | A00B00C00 | 1631 |
| Sample 3 | 10 | 6.25 | No | A00B02C00 | 1600 |
| Sample 4 | 0 | 6.46 | Graphite | A08B00C06 | n.a. |

As can be seen in the tables 1 and 2, a gradient is formed when the carbon balance is such that no eta phase and no graphite is present.

Example 3 PD Depression

Inserts with the geometry CNMG 120408-PM geometry, made according to Example 1 (Sample 3), were tested in a turning operation under dry conditions. As a reference, the commercial grade GC4325 with the same geometry as Invention 1 was used, herein called Comparative 1. Both inserts were coated with the same coating.

The work piece material was SS2541-03 (Al-oxidized), hardness 275-335 HB, with the following conditions:

| | |
|---|---|
| Vc | 98-150 m/min |
| f | 0.7 mm/rev |
| $a_p$ | 2 mm |

Measured quantity: Edge depression (μm).
The results are shown in Table 3.

TABLE 3

| | Edge deformation (μm) | | |
|---|---|---|---|
| Vc (m/min) | 98 | 130 | 150 |
| Invention 1 | 8 | 15 | 10 |
| Comparative 1 | 20 | 46 | 60 |

The invention claimed is:

1. A cutting tool comprising a cemented carbide substrate, wherein said substrate comprises a microstructure of WC, a gamma phase comprising (W,M)C and/or (W,M)(C,N) wherein M is one or more of Ti, Ta, Nb, Hf, Zr and V, and a binder phase, said substrate including a binder phase enriched surface zone which is depleted of gamma phase, wherein no graphite and no eta phase is present in the microstructure of said substrate and wherein the binder phase is a high entropy alloy comprising 4 or more elements selected from Co, Cr, Cu, W, Fe, Ni, Mo and Mn wherein the amount of each element is between 5 to 35 at % of the total amount of the high entropy alloy.

2. The cutting tool according to claim 1, wherein at least one of the elements in the high entropy alloy is selected from Cr, Fe, Ni and Co.

3. The cutting tool according to claim 1, wherein at least two of the elements in the high entropy alloy are selected from Cr, Fe, Ni and Co.

4. The cutting tool according to claim 1, wherein the high entropy alloy includes Co, Cr, Fe and Ni.

5. The cutting tool according to claim 1, wherein the high entropy alloy includes Co, Cu, Cr, Fe and Ni.

6. The cutting tool according to claim 1, wherein a thickness of the surface zone is between 2 and 100 μm.

7. The cutting tool according to claim 1, wherein an amount of the gamma phase is between 3 to 25 vol %.

8. The cutting tool according to claim 1, wherein the substrate is provided with a coating.

* * * * *